United States Patent
Biondo et al.

[11] Patent Number: 5,860,688
[45] Date of Patent: Jan. 19, 1999

[54] AUTOMOTIVE WINDOW WATER MANAGEMENT LACE AND METHOD OF MANUFACTURE

[75] Inventors: James R. Biondo, Oakland County, Mich.; Timothy J. Schlater, Miami County; Jack D. Young, Montgomery County, both of Ohio

[73] Assignee: Creative Extruded Products, Inc., Tipp City, Ohio

[21] Appl. No.: 734,399

[22] Filed: Oct. 16, 1996

[51] Int. Cl.⁶ .................................................... B60J 10/02
[52] U.S. Cl. ............................................ 296/93; 296/146.15
[58] Field of Search ................................ 296/93, 146.15

[56] References Cited

U.S. PATENT DOCUMENTS

| | | | |
|---|---|---|---|
| 4,757,659 | 7/1988 | Miyakawa et al. | 52/400 |
| 4,757,660 | 7/1988 | Miyakawa, et al. | 52/400 |
| 5,032,444 | 7/1991 | Desir, Sr. | 428/122 |
| 5,039,157 | 8/1991 | Yada | 296/93 |
| 5,222,336 | 6/1993 | Yada et al. | 296/93 |
| 5,228,738 | 7/1993 | Kato | 296/93 |
| 5,311,711 | 5/1994 | Desir, Sr. | 52/208 |
| 5,358,764 | 10/1994 | Roberts et al. | 296/93 |
| 5,389,423 | 2/1995 | Yada | 428/167 |

Primary Examiner—Gary C. Hoge
Attorney, Agent, or Firm—Reuben Wolk

[57] ABSTRACT

An exterior molding, also known as lace, placed around a fixed automotive window, such as a windshield, for channeling fluids along the sides. The molding comprises a first segment extending continuously along the top and sides; two identical segments extending along the sides only, secured to the first segment; and two identical mirror image segments around the upper corners of the window which are beneath the exterior and which provide transitions between the first segment and the side segments. The side and corner segments contain grooves which serve to channel rain and window washer fluid, and are secured together with the first segment to form a unitary molding having a smooth, continuous outer appearance.

31 Claims, 4 Drawing Sheets

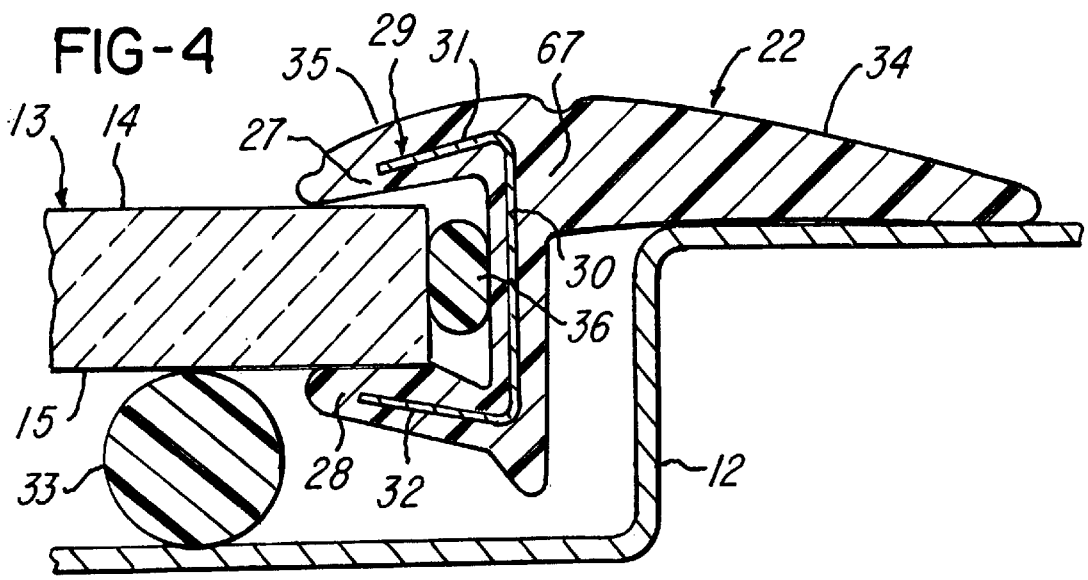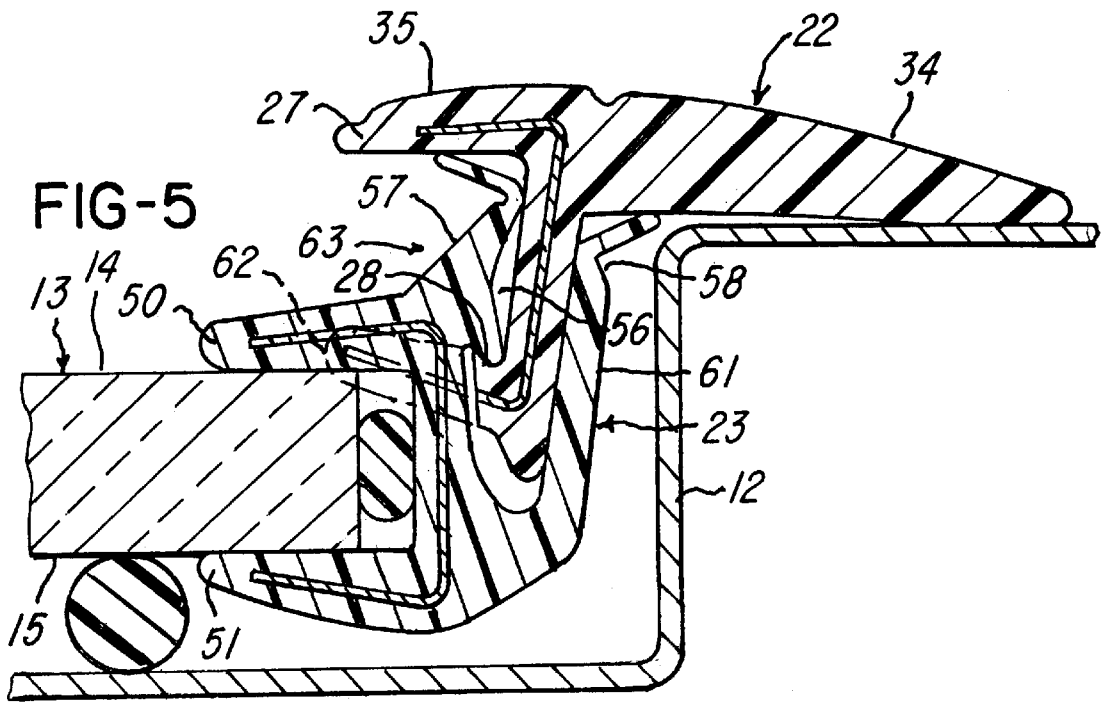

AUTOMOTIVE WINDOW WATER MANAGEMENT LACE AND METHOD OF MANUFACTURE

BACKGROUND OF THE INVENTION

The present invention relates to a molding, also known as a lace, which retains an edge of a fixed automotive window, such as a windshield or a rear window, and conceals the space between the window and an adjacent body panel, and also channels rain water and windshield washer fluid which accumulates on the window in a controlled manner along the sides.

PRIOR ART STATEMENT

Fixed window moldings, or lace, are used in all automotive applications. Typical patents illustrating conventional moldings are shown in Desir Jr. U.S. Pat. No. 5,032,444; and Desir Jr. U.S. Pat. No. 5,311,711. These moldings include portions which grip the edge of the glass and have a crown portion concealing the gap between the glass and the adjacent body panel. However, fluids on the windshield of the vehicle can run uninhibited onto the side glass where it may enter through a partially opened window. In order to overcome this problem, moldings have been developed to channel the fluids through pre-formed grooves. Typical of such moldings are those formed by a single extrusion process, such as shown in Miyakawa U.S. Pat. Nos. 4,757,659 and 4,757,660; and Yada U.S. Pat. No. 5,389,423. However, the moldings of the prior art as manufactured, have inherent defects in their process, which are discussed below.

SUMMARY OF THE INVENTION

The window molding of the present invention is an improvement over the prior art, and is comprised of a plurality of combined segments, each of which may consist of various components, instead of a part formed of a single piece. More specifically, the molding comprises a principal extruded segment which extends around the peripheral extent of the window and grips only the top or upper edge of the window. Separate side segments grip the side edges of the window and are interlocked with the lower ends of the principal segment. Corner segments, which are designed to grip the curved upper corners of the window, make the transition between the principal segment and the side segments, and are beneath the first segment so that one viewing the front of the window will mostly see the outer surface of the principal segment, thus creating a smooth, attractive appearance with no visible joints. The fluid-conveying channels are incorporated in the side and corner segments and start from a thin slit at or near the upper corners, and increase to a maximum depth in the grooves in the side members.

Although at first blush it would appear to be more desirable to make the molding of a single piece, as shown by the prior art, this has not turned out to be the case. It has been demonstrated that the process of changing the shape of a single piece molding having a configuration with no grooves for fluid channels, to one having a configuration that includes fluid channels, such as by the variable extrusion process, is relatively slow and inconsistent. This process is limited in the number of material components that can be used, and produces excessive scrap. Our novel process permits the continuous application of the principal segment around the periphery of the glass to provide the attractive appearance without visible segments, just as if the molding were made of a single member. The side segments are cut into desired lengths and secured to the principal segment. The corner transition segments are adhered beneath the surface of the principal segment at the junctions of the principal and side segments and the side and corner segments are contiguous to form a continuous, effective channel system. Another objection to the prior art water channeling moldings resides in the fact that it is usually difficult to fit the corner sections in a proper manner because the formulation of the top and sides may not lend itself to the flexibility required around the corners. The present product overcomes this problem because the transition segments are specially formulated and better adapted to fit the corners with a desirable shape.

Accordingly, it is a principal object of the invention to provide a molding for a fixed automotive window that efficiently channels accumulated rain water or windshield washer fluids along the sides.

It is another object to provide a multiple part molding that provides for a proper fit and an attractive exposed surface without visible junction lines on the principal exposed segment.

It is a further object to provide a molding that can be fabricated with a desirable corner shape to properly fit around the window corners.

It is still another object to form such a molding of separate segments which may be easily integrated into a final product to accomplish its purpose.

It is still another object to form such a molding in an efficient and inexpensive manner.

These and other objects and features will become apparent from the embodiments described and shown herein.

DESCRIPTION OF THE DRAWINGS

FIG. 4 is an enlarged sectional view of the upper segment of the molding extending around the upper surface of the windshield, taken along the lines 4—4 of FIG. 1.

FIG. 5 is an enlarged sectional view of a side portion of the molding, taken along lines 5—5 of FIG. 1.

DESCRIPTION OF THE PREFERRED EMBODIMENT

Figure 1:
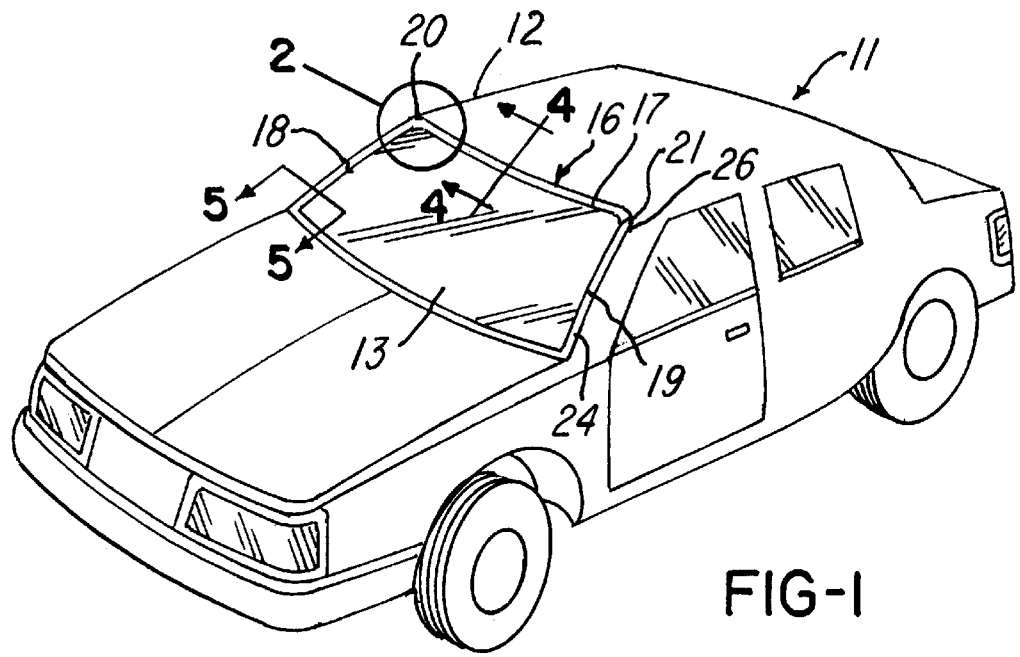
FIG. 1 is a front perspective view of a typical automotive vehicle, illustrating the novel molding placed around the windshield thereof.

Referring now to the drawings, the typical automotive vehicle 11 shown in FIG. 1 is a passenger automobile, which contains among other parts, a body panel 12 and a fixed window in the form of a windshield 13 which is attached to the automobile by means of an adhesive in a manner well known in the art. The window has an outer surface 14; that is, a surface exposed to the outside; and an inner surface 15 on the inside of the vehicle. The novel molding 16, which is the subject of this invention, is placed around the top 17, sides 18 and 19, and upper corners 20 and 21 of the windows to grip the edges of the window and conceal the space between the window and the adjacent body panel. In some applications, the molding may also be placed along the bottom as well. The molding comprises means for channeling fluids such as water or windshield washer fluid along the sides and around the corners. The molding is comprised of three segments; a principal segment 22; two side segments 23 and 24 which are mirror images of each other; and two corner segments 25 and 26 which in turn are mirror images of each other.

Figure 2:
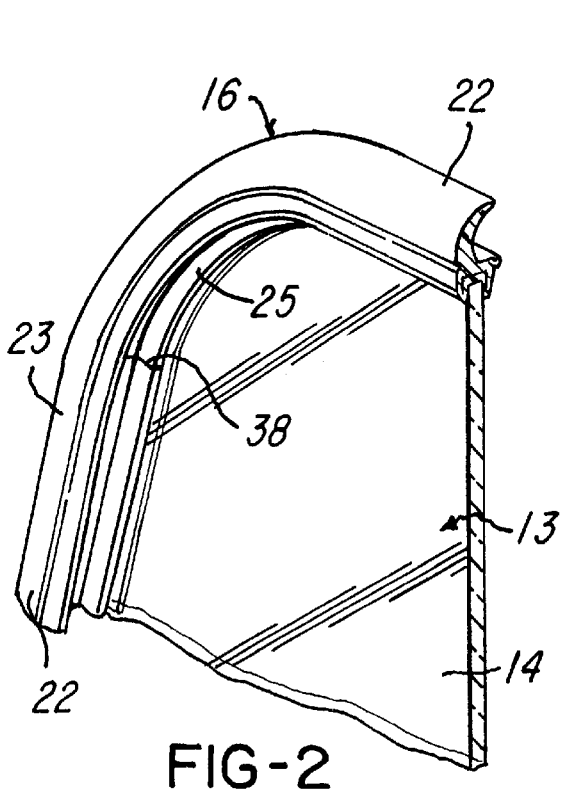
FIG. 2 is an enlarged detail view of the left hand upper area of FIG. 1 illustrating a portion of the novel molding.
Figure 3:
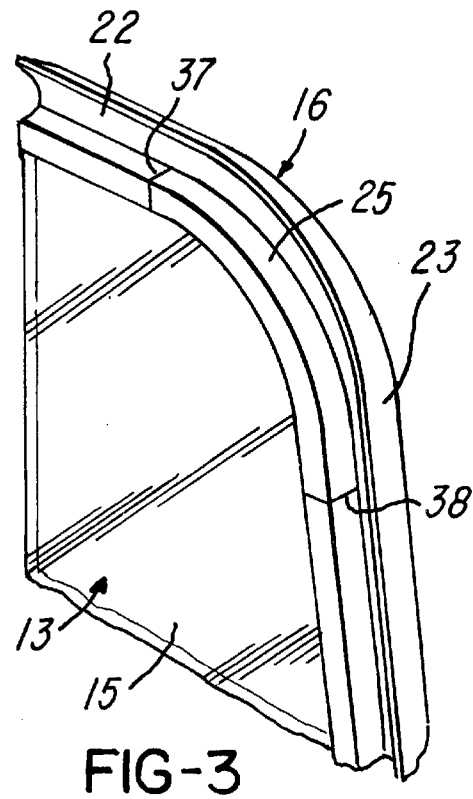
FIG. 3 is a view of the reverse area of FIG. 2.
Figure 8:
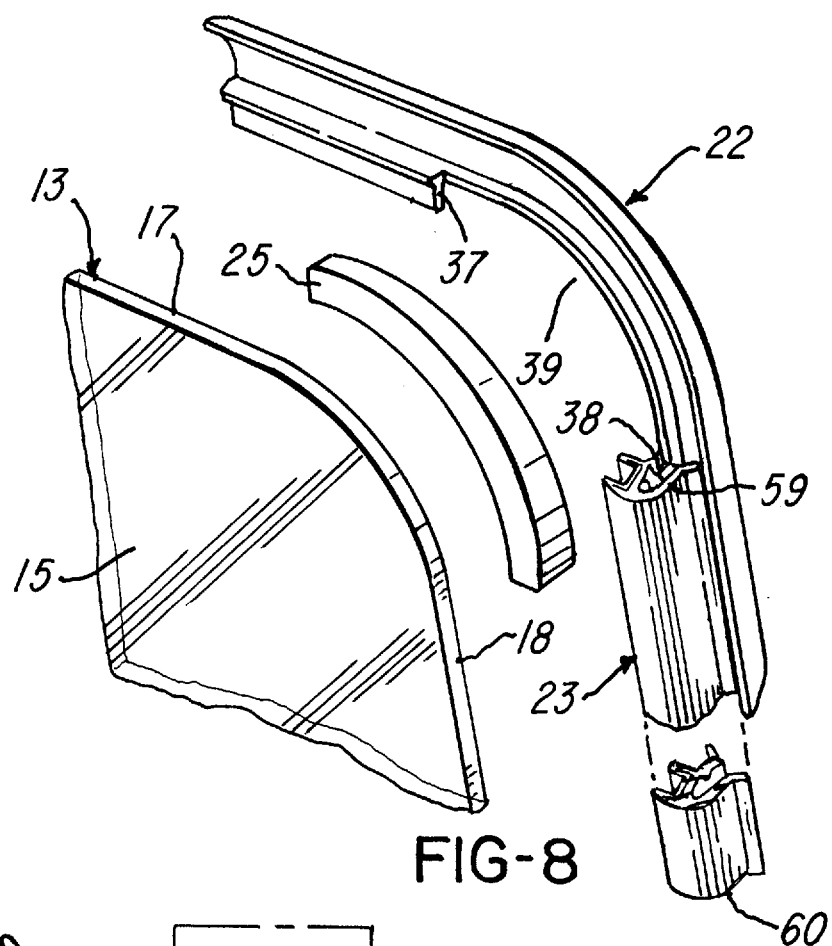
FIG. 8 is an exploded view showing the relationship of the corner segment and the principal segment.

The principal segment, as best shown in FIGS. 2 and 3, is formed of a continuous strip of elastomeric material, such as polyvinyl chloride, preferably having a Shore A hardness of between 80 and 90. The segment also includes a metal reinforcement which will be described later, and extends around the top, both upper corners, and both sides of the window. The bottom edge of the segment typically stops at the bottom ends of the sides. Depending upon the sides and shape of the window, the strip is about 150 to 180 inches in length. Preferably, this segment is formed by an extrusion process. The cross-sectional view of the segment 22 is shown in FIG. 4, and has a main body 67 and two spaced clamping members 27 and 28 which extend at approximately right angles from the body; these members being opposite from and approximately parallel to each other and to the window surfaces to retain a window edge. A reinforcement 29, made of a metallic material such as aluminum and having a thickness of approximately 0.008 inches, is imbedded within the segment. The reinforcement has a body 30 parallel to the body 67 and has legs 31 and 32 which are shown as generally parallel to each other; but which may be angled inwardly toward each other at an angle of 60 and 89 degrees. These legs are thus generally parallel to the members 27 and 28, and serve to enhance the retention to the window edge by the members. The use of a similar metallic reinforcement is disclosed in U.S. patent application Ser. No. 08/387,226, filed Feb. 13, 1995, now U.S. Pat. No. 5,624,148, issued Apr. 29, 1997, of common assignment and having some common inventors. The window and novel molding is attached to the body panel 12 by means of an adhesive. The segment 22 has a first outer crown portion 34 which contacts the body panel to conceal the space between it and the window, and a second outer crown portion 35 which contacts the outer surface 14 of the window edge adjacent to member 27. An adhesive 36 is commonly used to secure the edge of the window to the segment. As is shown in FIGS. 2 and 3, the principal segment only grips the window edge at the top of the window, but the crown portion 34 is continuous and contacts the body panel adjacent to the top, upper corners and sides of the window. As noted earlier, it typically does not extend along the bottom edge of the window. As shown in FIG. 8, a portion of the members 27 and 28 have been cut away at upper end 37 and lower end 38 to form an open area 39. The same arrangement applies to the opposite side of the window, which is not shown. The corner segments 25 (shown) and 26 (not shown) are placed within the open area to provide a contiguous appearance, as further described below. Along the open area, therefore, the members 27 and 28 of the principal segment do not grip the edges of the glass; the inserted corner segments perform that function. The part of the principal segment which extends along the sides of the window, from the cut 38 to the bottom end 60 also do not grip the edges of the glass. This function instead is provided by the side segments 23 (shown) and 24 (not shown); these segments being retained by the members 50 and 51 which are coextensive therewith.

Figure 6:
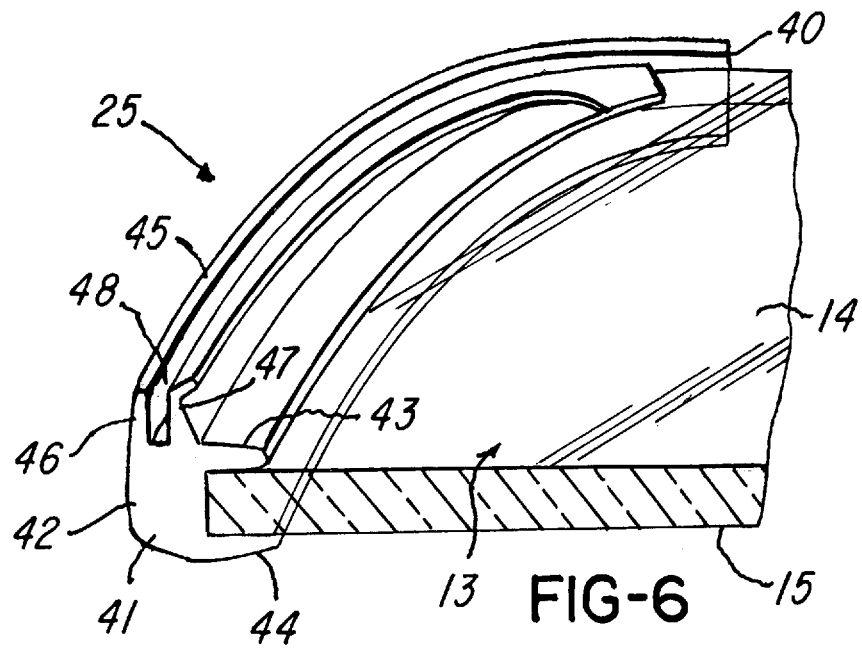
FIG. 6 is a perspective view of a corner segment of the molding.

FIG. 6 illustrates the corner segment 25, which is made of an elastomeric material such as polyvinyl chloride similar to the material of segment 22, and having a similar hardness. This part is approximately 2 to 6 inches long depending on the specific window shape and dimensions. Segment 25 is preferably formed by injection molding, either separately or into adjacent segments, and formed to accommodate the shape of the window corners, thus providing a tighter fit thereto. As shown in FIG. 3, the segment will fit within the open area 39 of segment 22 and has an upper end 40 adjacent the upper cut end 37 of the principal segment, and a lower end 41 adjacent the side segment 23. The body 42 of this segment is located on the inner surface 15 of the window, and has an inner clamping member 43 and an outer clamping member 44 extending along the length of the segment for gripping the edges of the window at the corner areas. The inner surface 45 of the inner clamping member forms a smooth, continuous surface with the inner clamping member 28 of the principal segment above and below the open area 39. Thus the corner segment fills in the open area. The body 42 extends outwardly to form an outer rib 46 and a parallel rib 47, both defining a groove 48 that is concealed under the crown 35 of the principal segment, as shown in FIGS. 4 and 5. Groove 63 then serves as the upper portion of the water channeling means which gradually taper down towards the outer surface 14 of the window, from the lower end 41 to the upper end 40, and merge with the member 44 at the upper end. This taper thus acts as a spacer to raise the outer surface of the principal segment away from the window, as shown in FIG. 2. The relationship of segment 25 to the entire molding assembly is also shown in exploded manner in FIG. 8. It is understood that a similar arrangement applies to the other side of the window involving corner segment 26. It should be noted that in this exemplary showing, the corner segments are configured to fit a fairly large radius of the window corners. However, the corner segments may accomodate much smaller radii, as small as 35 millimeters.

Figure 7:
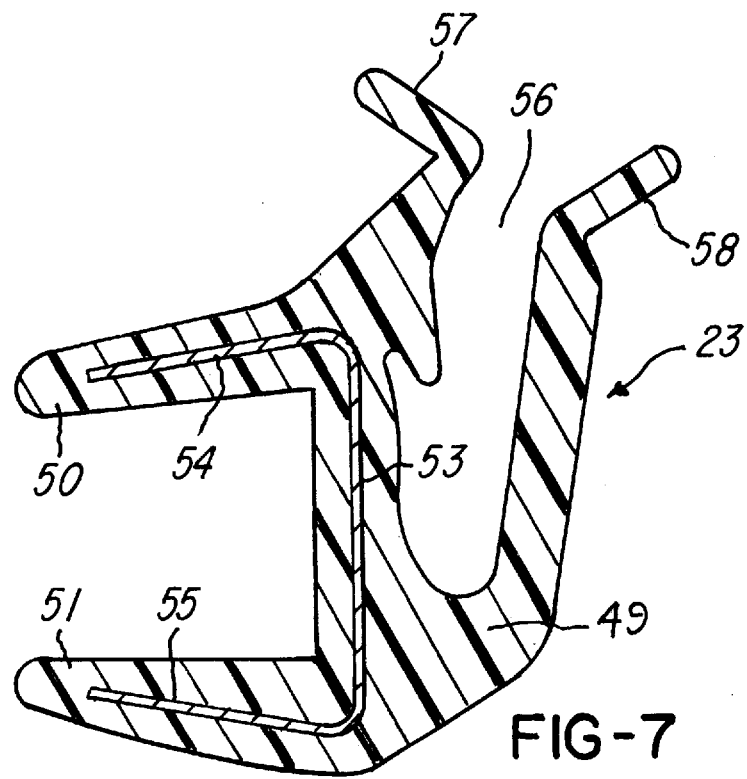
FIG. 7 is a sectional view of the side segment of the molding.
Figure 9:
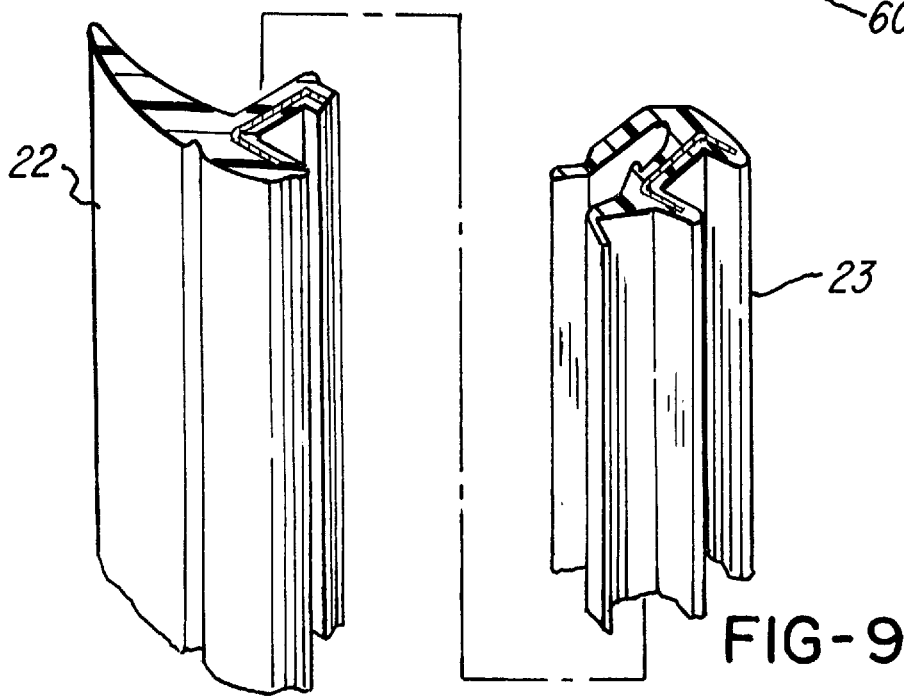
FIG. 9 is an exploded view showing the relationship of a side segment and the principal segment.

The side segment 23 is shown in cross-section in FIG. 7, and is approximately 30 inches in length. The other side segment 24 is a mirror image thereof. The side segment is preferably formed by extrusion and is primarily constituted of the same polyvinyl chloride material and with similar hardness as the principal segment. The segment comprises a body 49 and clamping members 50 and 51 extending at approximately right angles to the body; the members being opposite from each other and the window surfaces, in order to retain and grip the edge of the window much in the manner of the principal segment. A reinforcement 52 is similar to reinforcement 29 of the principal segment and is made of the same material. The reinforcement is imbedded within the segment and has a body 53 parallel to the body 49 and has legs 54 and 55. The legs are shown as being approximately parallel to each other, but may be angled inwardly toward each other at an angle of 60 to 89 degrees. The legs are thus generally parallel to the members 50 and 51 and serve to enhance the retention of the window edge by the members as shown in FIG. 5. The body of the segment has an irregular opening 56 which is defined by extensions 57 and 58 of the body 49 and are adapted to receive a portion of the principal segment in the manner shown in FIG. 5. The segment 23 is placed along the side of the window as shown in FIGS. 2 and 3 so that its upper end 59 abuts the lower end 41 of the corner segment, and the lower end 60 typically terminates at the bottom of the window. The legs 54 and 55 grip the window edge along the side. The portion of the principal segment is interengaged with the segment 23 by sliding the inner clamping member 28 of the principal segment within the opening 56 of the side segment as shown in FIG. 5. The extensions 57 and 58 grip the body 27 of the principal segment. The lower portion of the inner clamping member 28 of the principal segment is cut away; this is shown by the dotted lines 62 in FIG. 5. The portion cut away thus avoids interference with the side segment. The extension 57 is placed under the crown 35 of the principal segment, which forces the crown upward and outward from the outer surface of the window. This creates a groove 63 on the inner surface of the extension 57 for channeling the fluids. The result is a continuous flow channel along the side segments which ends at the intersections of the corner segment and the principal segment with a maximum height of glass outer surface of between one-eighth and one-half inch. This dimension may be varied by the relationship among the segments. The exploded view of FIG. 9 also illustrates the various relationships. As indicated above, the drawings illustrate one area of the window and molding, which is repeated in mirror image on the opposite side.

The molding may be assembled in various ways. The preferred method places the components upon a board as shown and formed to the shape of the glass. The corners are then molded into the assembly. The completed molding is then removed from the board and is ready for installation or shipping, depending upon where the assembly is performed.

The embodiment shown herein is exemplary, and modifications thereof are contemplated as being within the scope of the invention.

We claim:

1. In an automotive vehicle having a body panel and an adjacent fixed window having a space therebetween, an elastomeric window trim molding extending around the top, corners and sides of said window and adapted to contact said body panel and conceal said space; the improvement wherein said molding comprises a plurality of separate segments secured together to form a unitary member, the principal segment of said molding adapted to extend around the exposed outer surface of said top, sides and corners of said window and having means for gripping and retaining an outer edge thereof, side segments secured to said principal segment and adapted to extend along the sides of said window and having means adapted to grip and retain the outer edges of said sides, and corner segments secured to said principal and side segments and having means adapted to grip and retain an outer edge of said corners, said molding having a smooth, continuous outer appearance, said gripping and retaining portions of each of said principal, side and corner segments comprising an outer leg adapted to contact the outer exposed surface of said window edge, and an inner leg generally parallel to said outer leg adapted to contact the inner concealed surface of said window edge, said inner leg of said principal segment being shorter than said outer leg and having an end terminating along said top of said window.

2. The molding of claim 1 wherein said corner segments have upper and lower ends contacting end surfaces of said principal segment, a portion of said means in said principal segment for gripping and retaining said window edge being configured to define an open area which is free of means for gripping and retaining said window edges adjacent said corners, said corner segments being placed within said open areas for gripping and retaining said edges of said window corners and providing a smooth, continuous inner surface with said principal segment.

3. The molding of claim 2 wherein said molding comprises means in said corner segments and side segments adapted to be spaced from said outer surface of said window for channeling fluids therealong.

4. The molding of claim 3 wherein said fluid channeling means comprises portions in said corner segments contiguous to portions in said side segments for providing continuous channeling of fluid.

5. The molding of claim 4 wherein said fluid channeling means is in the form of a slit at the upper ends of said corner segments at the surface of contact with said principal segment, and increases in depth in a direction away from said outer surface of said window to a maximum depth in said side segments.

6. The molding of claim 1 wherein said corner segments are adapted to fit around said window corners with a minimum radius of approximately 35 millimeters.

7. The molding of claim 1 wherein said principal and said side segments are extruded, and said corner segments are injection molded.

8. The molding of claim 1 wherein said corner segments have upper and lower ends, and said terminating end of said inner leg of said principal segment is contiguous with an upper end of said inner leg of said corner segment.

9. The molding of claim 1 wherein each of said side segments has an end terminating along the sides of said window, said inner leg of said terminating end being contiguous with said lower end of said inner leg of said corner segment.

10. The molding of claim 1 wherein said inner and outer legs of said principal segment grip and retain said side segments along the entire longitudinal extent of said side segments.

11. The molding of claim 1 wherein each of said side segments comprises an extended body member generally at right angles to said inner and outer legs and spaced outwardly therefrom in a direction away from said window edge said extended body member being secured to said principal segment.

12. The molding of claim 1 wherein said principal segment comprises a body generally at right angles to said legs, said extended body member of said side segments comprising a first and second portion defining an opening therebetween, said body of said principal segment being secured within said opening.

13. The molding of claim 1 wherein said gripping and retaining portion of said principal segment has a generally U-shaped configuration and a reinforcement embedded therein.

14. The molding of claim 1 wherein said gripping and retaining portion of each of said side segments has a generally U-shaped configuration and a reinforcement embedded therein.

15. In combination, an automotive vehicle having a body panel and an adjacent fixed window having a space therebetween and an elastomeric window trim molding extending around the top, sides and upper corners of said window and contacting said body panel and concealing said space; the improvement wherein said molding comprises a plurality of separate segments secured together to form a unitary member, the principal segment of said molding extending around the exposed outer surface of said top, sides and corners of said window and having means gripping and retaining an outer edge of said window, side segments secured to said principal segment and extending along the sides of said window and having means gripping and retaining the outer edge of said sides, and corner segments secured to said principal and side segments and having means gripping and retaining an outer edge of said corners, said molding having a smooth, continuous outer surface, said gripping and retaining portions of each of said principal, side and corner segments comprising an outer leg contacting the outer exposed surface of said window edge, and an inner leg generally parallel to said outer leg contacting the inner concealed surface of said window ledge, said inner leg of said principal segment being shorter than said outer leg and having an end terminating along said top of said window.

16. The molding of claim 15 wherein said corner segments have upper and lower ends contacting end surfaces of said principal segment, a portion of said means in said principal segment gripping and retaining said window edge and defining an open area which does not grip and retain said window edges adjacent said corners, said corner segments being placed with said open areas and gripping and retaining said edges of said window corners and providing a smooth, continuous inner surface with said principal segment.

17. The molding of claim 16 wherein said molding comprises means in said corner segments and side segments spaced from the outer surface of said window for channeling fluids therealong.

18. In an automotive vehicle having a body panel and an adjacent fixed window having a space therebetween, and an elastomeric window trim molding extending around the top, corners and sides of said window and adapted to contact said body panel and said window and conceal said space: the method of forming a plurality of separate principal, side and corner segments, securing said segments together to form a unitary molding, extending said principal segment around the exposed outer surface of said top, corners and sides of said window, providing means on said principal segment for gripping and retaining an outer edge of said window, securing said side segments to said principal segment, extending said side segments along the sides of said window, providing means on said side segments for gripping and retaining the outer edges of said sides of said window, securing said corner segments to said principal and side segments, providing means on said corner segments for gripping and retaining an outer edge of said corners of said window, forming outer and inner legs on said gripping and retaining portions of each of said segments, contacting said outer legs against the exposed outer surface of said window edge, forming said inner legs generally parallel to said outer legs, contacting said inner legs against the concealed inner surface of said window edge, forming said inner leg of said principal segment shorter than said outer leg thereof, providing an end on said inner leg terminating along said top of said window, and forming said molding to have a smooth, continuous outer appearance.

19. The method of claim 18 wherein said principal segment has end surfaces and said corner segments have upper and lower end surfaces, comprising the further steps of placing said end surfaces of said principal segment in contact with said upper and lower end surfaces of said corner segments, forming said gripping and retaining means of said principal segment to define open areas free of means for gripping and retaining said window edges adjacent to said window corners, and placing said corner segments within said open areas for gripping and retaining said edges of said window corners, thereby providing a smooth, continuous inner surface.

20. The method of claim 18 comprising the further steps of providing spacing means in said corner segments and side segments, spacing said corner segments and side segments from the outer surface of said window, and providing means for channeling fluids along said corner and side segments.

21. The method of claim 20 comprising the further step of providing portions in said corner segments contiguous to portions in said side segments to form said fluid channeling means, thereby providing continuous channeling of said fluids.

22. The method of claim 21 comprising the further steps of forming said fluid channeling means in the form of a slit at the upper end of each of said corner segments at the surface of contact with said principal segment, and increasing the depth of said fluid channeling means in a direction away from said outer surface of said window to a maximum depth in said side segments.

23. The method of claim 18 comprising the step of forming said corner segments with a minimum radius of approximately 3.5 millimeters for fitting around said window corners.

24. The method of claim 18 comprising the steps of extruding said principal and side segments, and injection molding said corner segments.

25. The method of claim 18 wherein said corner segments have upper and lower ends, comprising the further step of placing said terminating end of said inner leg of said principal segment contiguous with an upper end of said inner leg of said corner segments.

26. The method of claim 18 wherein each of said side segments has an end terminating along a side of said window, comprising the further step of placing said inner leg of said terminating end contiguous with said lower end of each inner leg of said corner segments.

27. The method of claim 18 comprising the further step of utilizing said principal segment for retaining the entire longitudinal extent of said side segments.

28. The method of claim 18 comprising the further steps of forming extended body members on said side members generally at right angles to said inner and outer legs, spacing said extended body members outwardly from said inner and outer legs in a direction away from said window edge, and securing said extended body members to said principal segment.

29. The method of claim 28 comprising the steps of forming a body in said principal segment generally at right angles to said legs, forming said extended body member of each of said side segments into first and second portions defining an opening therebetween, and securing said body member of said principal segment within said opening.

30. The method of claim 18 comprising the further steps of forming said gripping and retaining portion of said principal segment into a generally U-shaped configuration, and embedding a reinforcement therein.

31. The method of claim 18 comprising the further steps of forming said gripping and retaining portion of each of said side segments into a generally U-shaped configuration, and embedding a reinforcement therein.

* * * * *